United States Patent
Michenfelder et al.

(10) Patent No.: US 6,175,205 B1
(45) Date of Patent: Jan. 16, 2001

(54) DEVICE FOR OPERATING A WINDSHIELD WIPER

(75) Inventors: Gebhard Michenfelder, Lichtenau; Harald Buehren, Hildesheim; Henry Blitzke, Buehl; Mario Kroeninger, Buehl-Neusatz, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/402,413
(22) PCT Filed: Mar. 19, 1998
(86) PCT No.: PCT/DE98/00804
   § 371 Date: Dec. 20, 1999
   § 102(e) Date: Dec. 20, 1999
(87) PCT Pub. No.: WO98/45148
   PCT Pub. Date: Oct. 15, 1998

(30) Foreign Application Priority Data

Apr. 4, 1997 (DE) .............................................. 197 13 835

(51) Int. Cl.$^7$ ................................. H02P 1/04; B60S 1/00
(52) U.S. Cl. ......................... 318/444; 318/466; 318/483; 318/DIG. 2
(58) Field of Search .................... 318/440–479, 318/DIG. 2, 483, 643; 388/907.5, 916; 15/250.12, 250.13, 250.17, 250.001; 340/602, 604; 250/574, 575

(56) References Cited

U.S. PATENT DOCUMENTS

| | | | |
|---|---|---|---|
| 5,453,670 | * 9/1995 | Schaefer | 318/444 |
| 5,508,585 | * 4/1996 | Schaefer | 318/444 |
| 5,568,027 | * 10/1996 | Teder | 318/483 |
| 5,694,012 | * 12/1997 | Pientka et al. | 318/444 |
| 5,969,493 | * 10/1999 | Pientka et al. | 318/483 |

FOREIGN PATENT DOCUMENTS 41 41 348 A1   6/1993 (DE) .

* cited by examiner

*Primary Examiner*—Paul Ip
(74) *Attorney, Agent, or Firm*—Michael J. Striker

(57) ABSTRACT

A device (10) for operating a windshield wiper (12) is proposed, with a moisture sensor (22) for detecting the wetness of a window that in addition to detecting rain and droplets also detects fog and drizzle. The measured values (Us) of the moisture sensor (22) are allocated incremental values (Ink) by the control unit (16). The difference between two successive incremental values (Ink) is to be added, with a sign (+ or −), in the memory (28) to a sum (Σ) of differences formed previously in the same way, and when a threshold (S) is reached by the sum (Σ) stored in the memory (28), the control unit (16) trips a wiper operating mode.

13 Claims, 2 Drawing Sheets

| MEASURED VALUES $U_S/_{INK}$ | DIFFERENCE $/_{INK}$ | SUM $\Sigma/_{INK}$ |
|---|---|---|
| 202 | - | STARTING VALUE = 105 |
| 206 | +4 | 105 |
| 205 | -1 | 104 |
| 206 | +1 | 105 |
| 207 | +1 | 105 |
| 206 | -1 | 104 |
| 206 | 0 | 104 |
| 204 | -2 | 102 |
| 203 | -1 | 101 |
| 202 | -1 | 100 |
| 200 | -2 | 98 |
| 199 | -1 | 97 |
| 198 | -1 | 96 |
| 196 | -2 | 95 |
| 194 | -2 | 95 |

US 6,175,205 B1

DEVICE FOR OPERATING A WINDSHIELD WIPER

BACKGROUND OF THE INVENTION

The invention is based on a device for operating a windshield wiper.

A device for controlling a windshield wiper system is already known (from German Patent Disclosure DE 41 41 348 A1), which automatically adapts the wiping cycle frequency to qualitatively and/or quantitatively varying states of the precipitation on the window. To that end, the signals of an optical rain sensor are evaluated by a circuit arrangement. A wiping cycle is initiated when the signals undershoot a particular switching threshold. Each time the wiper sweeps over the rain sensor, the signal increases again, up to a maximum signal value, which is then stored in memory as a reference value for the next wiping cycle. The switching threshold is defined at 95%, as a function of this reference value.

A substantial disadvantage of this control arrangement is that after a defined period of time has elapsed, a new wiping cycle is tripped if during this time period no new precipitation has formed to a sufficient extent, and if the signal value of the sensor device does not undershoot the switching threshold. A new reference value is thus formed, because the old one in the meantime may no longer be usable, because of the temperature drift of the sensor signal. Yet this means that the wiper will be wiping a dry or nearly dry window.

Another resultant disadvantage is that signals generated by fog or drizzle cannot be distinguished from the signal change caused by an increase in temperature of the sensor: Both effects cause the signal value to undershoot the switching threshold.

Still another disadvantage is that the reference value is written in anew for each wiping operation and used to determine the switching threshold for the next wiping cycle. Heavy soiling of the window, for instance, leads to a lower reference value and thus a lower switching threshold, so that the wiping operation is not tripped until there is a heavier total coating of both soil and moisture on the window. This heavier coating impairs the driver's vision and is a safety risk.

It is therefore an object of the present invention to provide a device for operating a windshield wiper, which avoids the disadvantages of the prior art.

In keeping with these objects and with others which will become apparent hereinafter, one feature of present invention resides, briefly stated, in a device for operating a windshield wiper, in which incremental values are allocated to the measured values by a control unit, and a mean value of at least two successive measured values is formed as the incremental value, and the respective difference between two successive incremental values is to be added with a sign + or − in the memory to a sum of differences formed previously in the same way, and finally when the threshold is reached by the sum stored in the memory, the control unit trips a wiper operating mode.

SUMMARY OF THE INVENTION

The device of the invention has the advantage that in addition to detecting rain and droplets, it also detects fog and drizzle. The moisture on the window is detected, and a wiper operating mode appropriate for the incident precipitation is tripped.

The allocation of the maximum measured value to a predetermined limit value when the wiper is put into operation is especially advantageous. After that, the allocation is corrected only if maximum values rise, for instance because the window has then been cleaned better.

The advantage of forming a mean value from the measured values resides in the quieter response of the device, because individual measured values do not lead to tripping of the wiper activity; only the measured values averaged over a short period of time, or from a predetermined number of values, does so.

Another advantage resides in the signal evaluation, which because of the device of the invention is independent of the signal amplification in the control unit, or its increase.

Along with program-controlled compensation for the temperature drift of the moisture sensor signals, measuring the temperature and taking it into account in the signal evaluation is also advantageous.

BRIEF DESCRIPTION OF THE DRAWING

Exemplary embodiments of the invention are shown in the drawing and described in detail below. Shown are FIG. 1, a device for operating a windshield wiper, shown in the form of a block circuit diagram.

DESCRIPTION OF THE PREFERRED EMBODIMENTS

Figure 1:
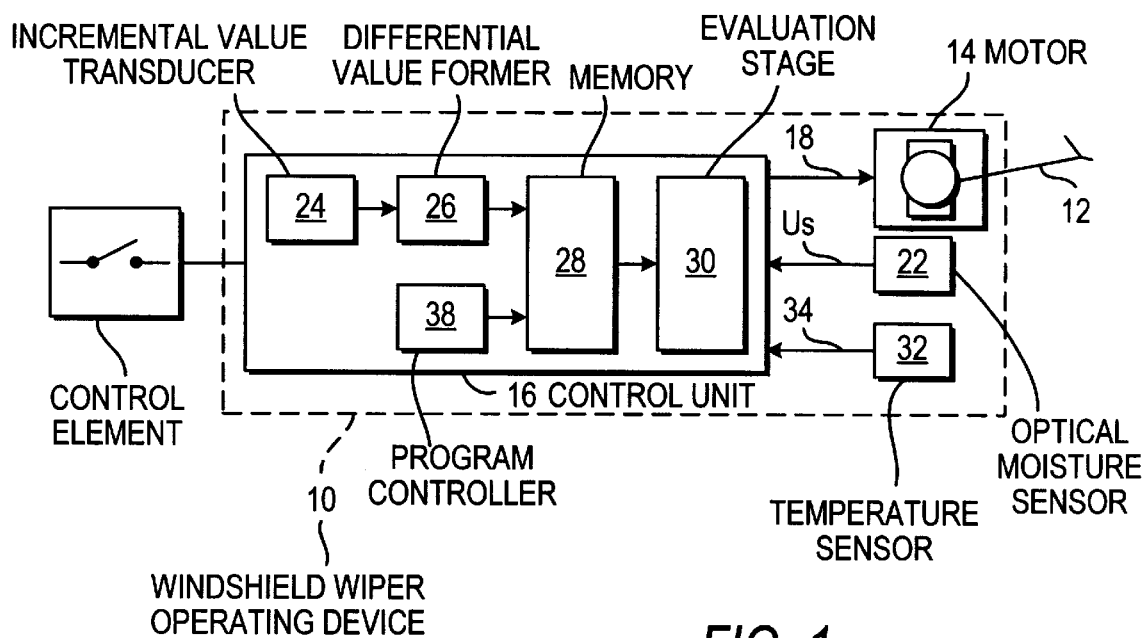

FIG. 1 shows a device 10 for operating a windshield wiper 12 for a window, not shown, of a motor vehicle, the device being driven by a motor 14. A control unit 16 triggers the motor 14 via control signals 18. The control unit 16 receives measured values Us, for instance from an optical moisture sensor 22, which operates on the principle of total reflection at the window, or in other words the out-coupling of light rays from the window by water droplets located on the surface of the window. For evaluating the measured values Us, the control unit 16 has an incremental value transducer 24, a differential value former 26, a memory 28, and an evaluation stage 30. A control element 36 is provided for turning the control unit 16, and thus the wiper operating mode, on and off.

In an expanded feature of the exemplary embodiment, a temperature sensor 32 furnishes input signals 34 to the control unit 16. These signals are evaluated by a program controller 38 and are written into the memory 28, in order to correct the measured values Us arriving from the sensor 22.

Figure 2:
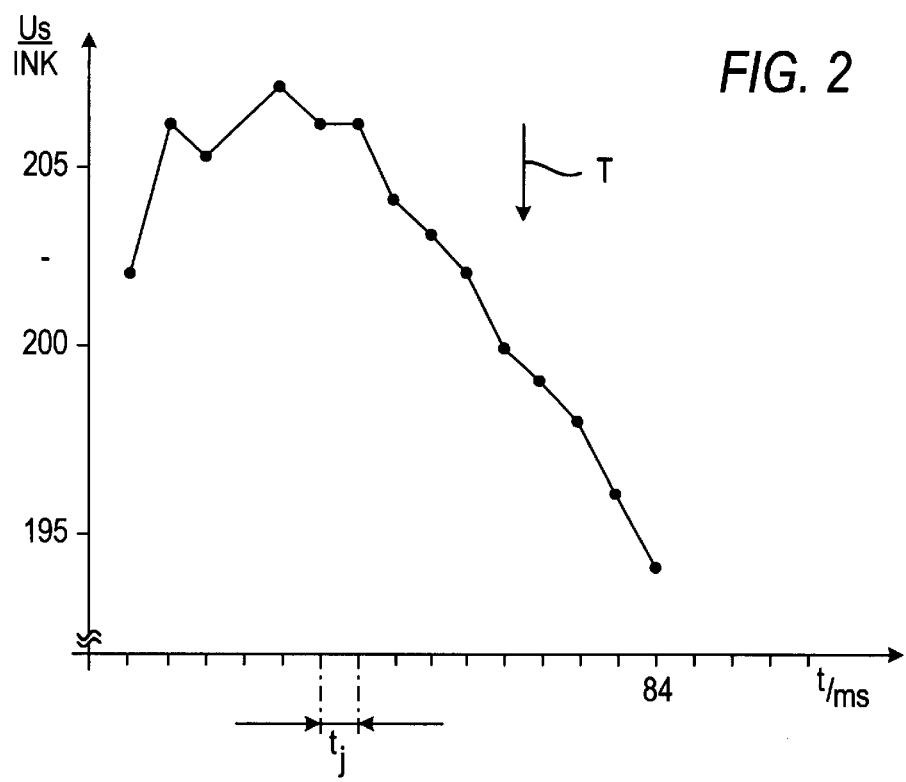
FIG. 2, a graph on which the exemplary measured values of a moisture sensor are plotted over time.

FIG. 2 shows an example of a hypothetical course of a moisture sensor signal that initially represents a dry window and decreases again in its further course because of increasing moisture on the window. The measured values Us of the signal are plotted over the time t in incremental values Ink, in accordance with the respective amplified signal variable. The measured values Us of the moisture sensor 22 are received, with an interval time ti of 6 ms, for example, by the control unit 16 and evaluated. The greater the degree of reflection at the moisture sensor 22, the cleaner the vehicle window is, and therefore the higher the measured value Us. The arrow T indicates the signal attenuation of the measured values Us upon an increase in temperature of the moisture sensor.

Figures 3, 4:
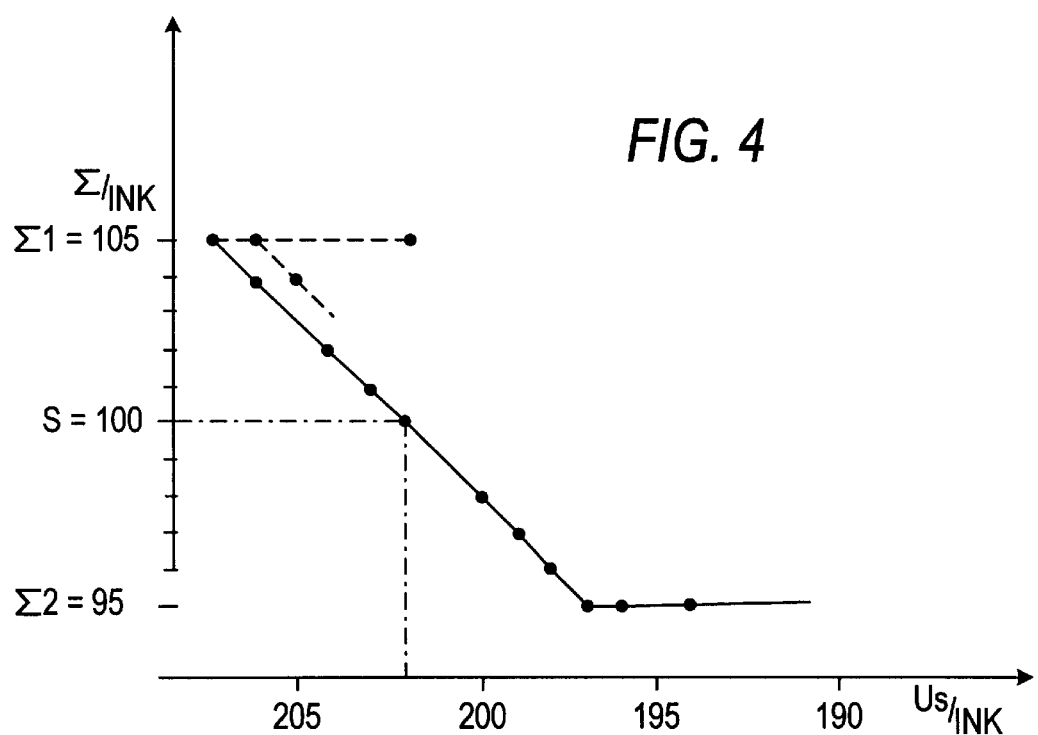
FIG. 3, a table for calculating the difference and sum $\Sigma$ of the measured values.
FIG. 4, a graph on which the values of the sum $\Sigma$ are plotted over the measured values of the moisture sensor.

FIG. 3 shows a table for calculating differences from the measured values Us and a resultant sum $\Sigma$ in the memory 28, taking as the example the measured values Us from FIG. 2. All the values entered are shown in increments Ink. The sum Σ begins with the starting value 105.

FIG. 4 shows the sum Σ, formed of the differences in the measured values US, starting with the starting value, as a function of the measured values Us of the moisture sensor 22, indicated in incremental values Ink. The values of the sum Σ are restricted to an arbitrary range, which is less than the range of the measured values Us, specifically by means of a first limit value Σ1, which here corresponds to the starting value 105 Ink, and a second limit value Σ2, which here is 95 Ink. Approximately in the middle of this range, there is a threshold S that can be arbitrarily predetermined by the control unit 16 and in this case is 100 Ink.

The first limit value Σ1=105 Ink is allocated to the highest attained measured value Us=207 Ink, for a clean window without any moisture coating it. The course of the curve is linear, until the second limit value Σ2=95 Ink is reached. If the measured value Us drops below the second limit value Σ2, then the value of the sum Σ is kept constant by the control unit 16. The curve shown in FIG. 4 applies to both decreasing and increasing measured values Us of the moisture sensor 22.

The mode of operation of the device of the invention will now be described in conjunction with FIGS. 2, 3 and 4.

The driver of a motor vehicle can turn the windshield wiper on and off by actuating the control element 36. If it begins to rain, he will turn the wiper on, so that the control unit 16 carries a first control signal 18 for activating the wiper 12 to the wiper motor 14, and the wiper 12 wipes for at least a first wiping cycle. During it, but no later than after the last brief sweep over the moisture sensor 22 by the wiper 12, the control unit 16 receives measured values Us from the moisture sensor 22, shown here for a greatly truncated (hypothetical) period of time of t=84 ms. These measured values are evaluated by the control unit 16 as follows:

As seen in FIG. 2, after every interval time ti, the incremental value transducer 24 allocates discrete incremental values Ink to the measured values Us. A timer can for instance be used as the incremental value transducer 24. The measured values US or incremental values Ink are then, after prior inverse value formation and multiplication by a factor to obtain values greater than one, delivered to the differential value former 26. There the current measured value Us or incremental value Ink is subtracted from the previous measured value Us or incremental value Ink, and the difference is written in the memory 28, with the applicable sign (+ or −). In the memory 28, which is preferably RAM, the differences are added together and yield a sum Σ.

As shown in the example in FIG. 3, when the device 10 is put into operation by the driver, the first limit value Σ1 is written into the memory 28 as a starting value (in this case, 105 Ink) for the sum Σ.

After the first wiping cycle of the wiper 12, the condition of the window improves, and the measured values Us of the moisture sensor 22 rapidly increase. Because of the evaporating streaks on the window, the increase in the measured values Us takes longer than it takes to wipe the active sensor area. The positive differences formed are not added to the starting value in the memory 28, and they therefore allocate the first limit value Σ1 to the cleanest condition of the window (in this case Us=207 Ink) that has been achieved by this wiping cycle. At the same time, the threshold S and the second limit value Σ2, as well as any other value of the sum Σ, are re-allocated to the measured values Us; that is, with the allocation of the first limit value Σ1, the entire range of the sum Σ shifts toward the maximum measured value Us—toward the left, as indicated by dots in FIG. 4.

Any other value Σ1, Σ2 of the sum Σ can also be used as the starting value, here including the values between 95 Ink and 105 Ink. In that case, the positive differences formed are added to the sum Σ, until the first limit value Σ1 is reached. It must be taken into account that starting values below the threshold S cause an immediate tripping of wiper activity once the device 10 has been activated. The most logical solution is therefore to use the first limit value Σ1 as the starting value.

Thus when the device 10 is put into operation, the allocation is assigned once and for all. Putting it into operation means that the driver has closed the ignition contact of the motor vehicle, for instance, and thereupon actuates the control element 36 for the first time. No further allocations need be assigned during the ensuing drive, because within this short period of time, aging of the moisture sensor 22 is not apparent. However, if later on, when the device 10 is put into operation again, or at a later time in wiper operation a measured value is ascertained that is higher than the previously highest measured value Us, or in other words if the window is cleaner or drier, or if there is greater signal amplification, then that measured value is allocated to the first limit value Σ1, by the method described above.

With an increasing coating of moisture on the window, the measured values Us of the moisture sensor 22 and the sum Σ in the memory both decrease. If the value of the sum Σ drops below the threshold S, then the evaluation stage 30 downstream of the memory 28 detects this as rain and outputs a control signal 18 for turning the motor 14 back on. The wiper 12 cleans the window and in the process sweeps over the moisture sensor 22. The measured values Us therefore rise again, so that the sum Σ goes above the threshold S again. If precipitation continues to fall, the measured values Us drop again, and when they fall below the threshold S, a wiper operation is performed again. Depending on the intensity of the precipitation, an intermittent wiper mode with a variable length of time between sweeps, for instance, is attained.

The threshold S can preferably also be made variable, so that under various weather conditions the sensitivity of the moisture sensor 22 can be regulated. Day/night detection can for instance also be used in adjusting the sensitivity.

In the first few minutes after the system is put into operation, the temperature of the moisture sensor 22 rises rapidly, and after that it continues to rise only slowly. When there is a constant film of moisture on the window, the temperature increase causes an initially rapid, and then slowly decreasing, attenuation of the measured values Us. In FIG. 2, the curve for the measured values Us therefore shifts in the direction of solid arrow T, and the unchanged threshold S in FIG. 4 would already have been reached earlier, or in other words with even less moisture on the window. In an extreme case, the wiper 12 would be put into operation even though there was actually no moisture on the window.

To compensate for this temperature effect, additional correction increments, from the program controller 38 embodied as a temperature compensation means, are added to the sum Σ in the memory 28. Since the course of the temperature change is known per se, the program controller 38 can be programmed accordingly. The value of the sum Σ is augmented by the applicable correction increments by which the measured values US are dropping because of the temperature effect, so that when the moisture film on the window is constant, the sum Σ remains constant. For example, to compensate for the temperature drift at the beginning of the turn-on phase, one increment is added to the sum Σ every 5 minutes. A total of about 80 correction increments is added to the sum Σ to correct an about 30% change in level dictated by the temperature. If after about 5 to 10 minutes the moisture sensor 22 is in a state of thermal equilibrium, then no further correction increments of this kind are added.

When the ambient temperature warms up, this is taken into account by relying on experience, which tells that the maximum possible change in ambient temperature is about 20 C. per 5 minutes, and a fixed correction is made after the turn-on phase, as follows: If the value of the sum Σ is below the first limit value Σ1, for instance, then one increment is constantly added to the sum Σ every six seconds.

When the ambient temperature cools down, the measured values US rise (signal amplification), and the allocation of the maximum measured values US to the first limit value Σ1 is done by the method described at the outset and need not be addressed again.

In an alternative exemplary embodiment, the temperature of the sensor 22 and/or of the surroundings is measured by the temperature sensor 32, so that when the operating or ambient temperature rises, the influence of the temperature on the measured values Us is compensated for by the evaluation stage 30.

In an improved exemplary embodiment, mean values are first formed from the measured values Us. In forming the mean values, measured values Us are averaged over a short time (in this case 24 ms) or for a predetermined number of measured values (in this case, 4). It does not matter whether the mean values are formed directly upon detection of the first measured value Us, or only after the predetermined number of measured values or the elapsed period of time is detected. The mean values are then used instead of the measured values Us for calculating the differences, as already discussed above for the individual values. The calculated difference is added to the sum Σ in the memory 28 with the correct sign (+ or −). The evaluation of the sum Σ is done by the evaluation stage 30. In FIGS. 3 and 4, instead of the measured values Us in Ink, the mean value in Ink is plotted. Additionally analyzing the individual measured values Us in the evaluation stage 30 makes it possible to determine any trend that may be occurring.

In a further exemplary embodiment, instead of the calculated differences, weighted differences are added to the sum Σ in the memory 28. If the difference is from 1 to 5 Ink, for example, then the same value is added to the sum Σ, but for differences of 5 to 50 Ink or more, only a proportionate, lesser value of the difference is added. As a result, the moisture detection remains sensitive when there is little moisture, and becomes less sensitive when there are major changes in the amount of moisture.

What is claimed is:

1. A device for operating a windshield wiper, comprising a wiper motor; a control unit with a memory; a moisture sensor for detecting a wetness of a window, whose measured values vary as the wetness increases, said control unit allocating incremental values to the measured values, to form a mean value of at least two successive measured value as the incremental value, with respective difference between two successive incremental values to be added with a plus sign or a minus sign in said memory to a sum of differences formed previously in a same way, said control unit tripping a wiper operating mode when a threshold is reached by said sum stored in said memory.

2. A device as defined in claim 1, wherein in said control unit, an arbitrarily predeterminable first limit value and a second limit value of the sum are defined, and the first limit value is allocated to the measured value of said moisture sensor for a dry or clean window.

3. A device as defined in claim 2, wherein said first limit value is writable into said memory as a starting value for said sum.

4. A device as defined in claim 2, wherein said threshold is located in a range between said first and second limit values.

5. A device as defined in claim 3, wherein said threshold is embodied variably.

6. A device as defined in claim 1, wherein said control unit has means for temperature compensation which correct said sum by means of correction increments.

7. A device as defined in claim 6, wherein said means for temperature compensation is a program controller.

8. A device as defined in claim 1, and further comprising means for temperature detection which is formed as a temperature sensor.

9. A device as defined in claim 1, wherein said control unit includes an incremental value transducer, a differential value former, means for temperature compensation, and an evaluation stage.

10. A method of operating at least one windshield wiper having a wiper motor, a control unit with a memory and a moisture sensor for detecting a wetness of a window whose measured values vary as the wetness increases, the method comprising the steps of allocating incremental values to the measured values by the control unit; forming a respective mean value of at least two successive measured values as an incremental value; adding a difference between successive incremental values with a plus sign or a minus sign in the memory to a sum of differences formed previously in a same way; and when a threshold is reached by the sum stored in the memory, tripping a wiper operating mode by the control unit.

11. A method as defined in claim 10; and further comprising writing in the control unit an arbitrarily predeterminable first limit value into the memory as a starting value for the sum.

12. A method as defined in claim 10; and further comprising defining in the control unit an arbitrarily predeterminable second limit of the sum; and upon attainment of the second limit value and with further-increasing moisture, defining the sum as a value of the second limit value.

13. A method as defined in claim 10; and further comprising varying a temperature of the moisture sensor by rising the temperature; and imposing by the control unit correction increments on the sum by adding them to the sum.

* * * * *